(12) United States Patent
Yao et al.

(10) Patent No.: US 12,154,290 B2
(45) Date of Patent: Nov. 26, 2024

(54) METHOD OF EXTRACTING NUMBER OF STEM AND TILLERING FOR WHEAT UNDER FIELD CONDITION

(71) Applicant: NANJING AGRICULTURAL UNIVERSITY, Jiangsu (CN)

(72) Inventors: Xia Yao, Nanjing (CN); Tai Guo, Nanjing (CN); Xiaohu Zhang, Nanjing (CN); Yan Zhu, Nanjing (CN); Hengbiao Zheng, Nanjing (CN); Tao Cheng, Nanjing (CN); Yongchao Tian, Nanjing (CN); Weixin Cao, Nanjing (CN); Caili Guo, Nanjing (CN); Yu Zhang, Nanjing (CN); Jifeng Ma, Nanjing (CN); Rui Huang, Nanjing (CN); Jie Zhu, Nanjing (CN); Hongxu Ai, Nanjing (CN); Chongya Jiang, Nanjing (CN); Dong Zhou, Nanjing (CN)

(73) Assignee: NANJING AGRICULTURAL UNIVERSITY, Jiangsu (CN)

(*) Notice: Subject to any disclaimer, the term of this patent is extended or adjusted under 35 U.S.C. 154(b) by 375 days.

(21) Appl. No.: 17/441,877

(22) PCT Filed: Mar. 20, 2020

(86) PCT No.: PCT/CN2020/080438
§ 371 (c)(1),
(2) Date: Sep. 22, 2021

(87) PCT Pub. No.: WO2020/192586
PCT Pub. Date: Oct. 1, 2020

(65) Prior Publication Data
US 2022/0189053 A1 Jun. 16, 2022

(30) Foreign Application Priority Data
Mar. 22, 2019 (CN) .......................... 201910223270.1

(51) Int. Cl.
G06T 7/62 (2017.01)
A01B 79/00 (2006.01)
(Continued)

(52) U.S. Cl.
CPC .............. *G06T 7/62* (2017.01); *A01B 79/005* (2013.01); *G06F 18/2321* (2023.01); *G06T 5/70* (2024.01);
(Continued)

(58) Field of Classification Search
CPC ............. G06T 2207/30188; G06T 7/11; G06T 2207/10028; G06T 5/002; G06T 7/62;
(Continued)

(56) References Cited

U.S. PATENT DOCUMENTS

2019/0274257 A1* 9/2019 Papanikolopoulos .... G06T 7/62
2021/0158041 A1* 5/2021 Chowdhary ......... G05D 1/0246

FOREIGN PATENT DOCUMENTS

CN 103065352 A * 4/2013
CN 103942838 A * 7/2014
(Continued)

OTHER PUBLICATIONS

Jun. 24, 2020 International Search Report issued in International Patent Application No. PCT/CN2020/080438.
(Continued)

*Primary Examiner* — Ian L Lemieux
*Assistant Examiner* — Woo C Rhim
(74) *Attorney, Agent, or Firm* — Oliff PLC

(57) ABSTRACT

A field wheat stem tillering number extraction method, including: acquiring field wheat point clouds by means of a LiDAR, and extracting any row of wheat point clouds in a research area; projecting a Y axis to a plane, and retaining an X and Z axis; applying adaptive layering to obtain number of clusters of the wheat row; applying hierarchical clustering
(Continued)

analysis to obtain tillering number of each wheat cluster; and further obtaining stem tillering number of the whole wheat row, so as to extract a field wheat stem tillering number. The feasibility of an algorithm is verified by comparing the wheat stem tillering number extracted by means of the method with an actually measured field stem tillering number, and the method realizes rapid, accurate and nondestructive extraction of a large-field crop stem tillering number and provides theoretical basis and technical support for extraction of the field wheat stem tillering number.

10 Claims, 4 Drawing Sheets

(51) Int. Cl.
   *G06F 18/2321* (2023.01)
   *G06T 5/70* (2024.01)
   *G06T 7/00* (2017.01)
(52) U.S. Cl.
   CPC .. *G06T 7/0002* (2013.01); *G06T 2207/10028* (2013.01); *G06T 2207/30188* (2013.01)
(58) Field of Classification Search
   CPC . G06T 17/00; G06T 2207/30242; G06T 7/60; G06T 7/10; G06T 2207/20004; G06T 2207/20132; G06T 2200/04; G06T 7/0002; G06T 7/0004; G06V 20/188; G06V 10/267; A01B 79/005; G06F 18/2321; G06F 18/231
   See application file for complete search history.

(56) References Cited

FOREIGN PATENT DOCUMENTS

| CN | 104776800 | A | * | 7/2015 | |
|---|---|---|---|---|---|
| CN | 105910556 | A | * | 8/2016 | ............ G01B 11/28 |
| CN | 106845399 | A | * | 6/2017 | |
| CN | 107705309 | A | * | 2/2018 | ............ G06T 7/11 |
| CN | 107993243 | A | * | 5/2018 | ............ G06T 7/13 |
| CN | 109978047 | A | | 7/2019 | |

OTHER PUBLICATIONS

Jun. 24, 2020 Written Opinion issued in International Patent Application No. PCT/CN2020/080438.
Qinghua Guo et al. "Crop 3D: A Platform Based on Lidar for 3D High-Throughput Crop Phenotyping." Science in China: Life Sciences, vol. 46, No. 10, Dec. 31, 2016, pp. 1210-1221.
D. Reiser et al. "Clustering of Laser Scanner Perception Points of Maize Plants". Advances in Animal Biosciences: Precision Agriculture, Dec. 31, 2017, pp. 204-209.
R.D. Boyle et al. "Automated Estimation of Tiller Number in Wheat by Ribbon Detection". Machine Vision and Applications, Dec. 31, 2016.
Zhiqiang Wang et al. "Identification and Validation of Novel Low-Tiller Number QTL in Common Wheat". Theoretical and Applied Genetics, Jan. 25, 2016.

* cited by examiner

METHOD OF EXTRACTING NUMBER OF STEM AND TILLERING FOR WHEAT UNDER FIELD CONDITION

TECHNICAL FIELD

The present invention belongs to the field of nondestructive monitoring of crop life information in precision agriculture, relates to a field wheat stem tillering number extraction method, and particularly relates to an extraction method for researching a wheat stem tillering number under the field condition by means of Light Detection and Ranging (LiDAR) point clouds.

BACKGROUND

A stem tillering number is a powerful index of the yield and growth conditions of wheat. A too small stem tillering number may result in yield reduction, and a too great stem tillering number may easily result in the occurrence of pests and diseases. A reasonable wheat stem tillering number is the basis for the high and stable yield. Therefore, in actual production, the changes of the wheat stem tillering number must be timely and accurately monitored.

At present, methods for acquiring the wheat stem tillering number mostly adopt a traditional manual counting method. Such a method has the defects of heavy work load, time consumption, labor consumption and high subjectivity, is unfavorable to fast and accurate acquisition of wheat growth information, and cannot be applied to large-scale farmland growth condition information acquisition in precision agriculture. Through traditional optical remote sensing, it is difficult to acquire quantitative information such as the wheat tillering number, and additionally, the spectral information is easily affected by external environmental factors such as atmosphere and light conditions.

Terrestrial Laser Scanning, as a phenotypic analysis tool for rapidly and accurately acquiring object point clouds and extracting three-dimensional structures in a large area, has been successfully applied to acquire the crop canopy height and above-ground biomass, but there is a lack of an algorithm for extracting the wheat stem tillering number by means of the ground LiDAR, and particularly, the rapid and accurate extraction on the large-field crop stem tillering number has not been reported yet.

SUMMARY

The objective of the present invention is to provide a field wheat stem tillering number extraction method. Field growing wheat point clouds are acquired by means of a LiDAR, and the wheat stem tillering number extraction based on a ground LiDAR is realized by using an adaptive layering-hierarchical clustering analysis algorithm, and the defects of a traditional stem tillering number acquiring method can be overcome.

The objective of the present invention is achieved by the following technical solution:

A field wheat stem tillering number extraction method includes the following steps:

step (1): acquiring a wheat stem tillering number sample and point clouds;

step (2): randomly acquiring a row of wheat point clouds from a wheat point cloud image obtained in step (1), preprocessing the row of wheat point clouds, projecting a Y axis values to X-Z plane and retaining an X axis and a Z axis to obtain a wheat two-dimensional side view;

step (3): applying adaptive layering to obtain a number of clusters of the row of wheat; and step (4): applying hierarchical clustering analysis to obtain a tillering number of each cluster of wheat, and further obtaining a stem tillering number of the whole row of wheat; and step (5): verifying feasibility of the algorithm.

In step (1), the wheat point clouds are acquired by means of a ground LiDAR, and the wheat stem tillering number is synchronously acquired.

The wheat stem tillering number and the point clouds are from different years, different growth stages, different varieties, different planting densities and different nitrogen application levels.

A method of acquiring the wheat stem tillering number includes: selecting a wheat test area of 2 rows×1 m in each area, performing manual stem tillering number test, recording the stem tillering number of 1 m double-row wheat in each area, taking an average value as a stem tillering number m of 1 m single-row wheat, and further obtaining the wheat stem tillering number of the whole area.

2 wheat varieties: Shengxuan No. 6, and Yangmai 16. Wheat planting mode: Sowing in strip. 2 density levels: Row spacing being 25 cm ($2.4×10^6$ plants/ha), and row spacing being 40 cm ($1.5×10^6$ plants/ha). 3 nitrogen application levels: Pure nitrogen 0 kg/ha, 150 kg/ha, and 300 kg/ha. A nitrogen fertilizer, a phosphorus fertilizer and a potassium fertilizer are respectively urea, calcium superphosphate and potassium chloride, where 50% of the nitrogen fertilizer is used as a base fertilizer, 50% of the nitrogen fertilizer is used for dressing at a jointing stage, and other fertilizers are used as base fertilizers to be totally applied. The test adopts a random area group design, the repeating is performed for 3 times, and the number of areas is totally 36. An area of each area is 30 $m^2$ (6 m×5 m), and the total area is about 1080 $m^2$.

In step (2), the preprocessing the wheat point clouds includes: after point cloud registration and denoising processing, randomly acquiring point clouds of a row of wheat at first from a wheat point cloud of an area; expressing the row of wheat point clouds into a cuboid, defining a row length as X, a row width as Y and a plant height as Z; and performing three-dimensional sorting of point clouds in space by using an X coordinate axis as a main axis and a Z axis as an auxiliary axis, and projecting the three-dimensional point clouds onto an X-Z plane to obtain a wheat two-dimensional side view.

The point cloud registration includes: registering different coordinate systems to the same coordinate system by using an ICP algorithm in point cloud processing software RiSCAN PRO, where the ICP algorithm includes: repeatedly determining nearest point pairs, calculating coordinate conversion parameters of the nearest point pairs and finishing iteration until a given convergence precision is met. For two-point cloud data sets A and B with a certain overlapping portion, A is a reference point cloud data set, and the point cloud B is a coordinate system to be registered, and needs to be converted into the coordinate system of the point cloud A through rotation and translation.

The denoising processing includes: (1) removing drift points: removing noise points floating in the air by setting an elevation threshold (set to be 2 m) after normalization of point cloud height; and (2) removing mixed points: removing deviation points by setting a Deviation value (set to be 250).

In step (3), the adaptive layering includes: distinguishing wheat point clouds of a leaf layer from wheat point clouds of a stem layer in a plant height Z direction; laminating the stem layer onto the leaf layer to integrate the stem layer and the leaf layer into one layer; sorting the X axis according to X coordinate values; determining that the front is a cluster of wheat when a mixture of the leaf layer and the stem layer is met, continuous point clouds of the leaf layer are met later, but no point cloud of the stem layer is met; determining a number of clusters of the row of wheat one by one by parity of reasoning; and determining the total number of clusters of the row of wheat.

Specifically, the adaptive layering includes:

a) dividing a row of wheat into segments at intervals in a direction of the X axis, calculating a plant height of each segment of wheat after segment division (plant height=Z coordinate value at a highest point—Z coordinate value at a lowest point), and obtaining an average plant height H of the row of wheat; preferably, dividing the row of wheat into segments in the direction of the X axis according to a step length of 0.1 m so as to avoid calculation amount increase possibly caused by too small intervals and result underestimation possibly caused by too great intervals;

b) performing layering according to the Z axis, where a number of layers n=average plant height H/tangent sheaf height h, and numbering the number of layers in a sequence of Arabic numerals from top to bottom in the direction of the Z axis, where the tangent sheaf height h is 4 cm;

c) marking the leaf layer and the stem layer: because growth conditions of wheat in the same piece of land may be different, a highest layer after a top layer is removed may be a leaf layer of a high plant and may also be a top layer of a low plant, and a judgment standard is nonuniform; in order to ensure the result precision and reliability, removing a lowest layer and a highest layer, and respectively marking the point clouds of a top layer and a bottom layer of the remaining layers as the leaf layer and the stem layer;

d) laminating and integrating the stem layer and the leaf layer determined in step c) into one layer; sorting the X axis according to X coordinate values; determining that the front is a cluster of wheat when a mixture of the leaf layer and the stem layer is met, continuous point clouds of the leaf layer are met later, but no point cloud of the stem layer is met; and determining the number of clusters of the row of wheat one by one by parity of reasoning;

e) for the number of remaining layers, sequentially repeating step c) and step d) for analysis in the direction of the Z axis by taking adjacent 2 layers as a combination from top to bottom, so as to obtain the number of clusters of the row of wheat, where if the number of clusters of the row of wheat obtained from a certain combination is greater than that of a previous combination, it shows that the layer with a greater number in the combination is the stem layer, the layer with a smaller number is the leaf layer, the combination is a stem and leaf connection combination; and marking the number of layers of all leaf layers higher than the stem and leaf connection combination in the direction of the Z axis as the leaf layers, and marking the number of layers of all stem layers lower than the stem and leaf connection combination as the stem layers; and f) selecting one layer from the marked leaf layers, selecting one layer from the marked stem layers, and repeating step c) and step d) again to obtain the total number of clusters of the row of wheat $T_n$, where n=1, 2, 3, . . . , n.

In step (4), the hierarchical clustering analysis includes: in point clouds of each cluster of wheat, by taking each point as a variable (including Cartesian coordinates (x, y, z)) and selecting a Euclidean distance as a similarity measurement, respectively calculating the similarity measurement between the variables, classifying points with a high similarity into one class, i.e., one tillering so as to calculate a number of classes to obtain the wheat stem tillering number, and calculating the tillering number $T_{nk}$ (k=1, 2, 3, . . . , k, and k represents the tillering number in each cluster of wheat) of each cluster of wheat; obtaining a stem tillering number of one row of wheat according to $T_{sum}=T_1+T_2+T_3+ \ldots +T_n+T_{1k}+T_{2k}+T_{3k}+ \ldots +T_{nk}$; and finally, converting the stem tillering number of one row of wheat into a stem tillering number of the whole area.

A similarity measurement formula is: $d_{ij}=\sqrt{(x_i-x_j)^2+(y_i-y_j)^2+(z_i-z_j)^2}$ Where i and j represent 2 arbitrary points, dij is a Euclidean distance between variables i and j, coordinate information of the variable i is $(x_1, y_i, z_1)$, and coordinate information of the variable j is $(x_j, y_j, z_j)$.

Preferably, the hierarchical clustering analysis includes: in point clouds of each cluster of wheat, by taking each point as a variable and selecting a Euclidean distance as a similarity measurement, respectively calculating the similarity measurement between the variables, finding clusters 1 and 2 with a shortest Euclidean distance, merging the clusters 1 and 2 to be used as a new class, calculating a space from the new class to other clusters in the current cluster, setting an iteration condition to be that the Euclidean distance d=2 cm (a smallest distance between two tillering portions in one cluster of wheat), and stopping iteration when the condition that d>2 cm is met, so as to obtain the tillering number of each cluster of wheat.

In step (5), feasibility and accuracy of a test algorithm are verified by using independent year stem tillering number sample data, and comprehensive evaluation is performed on a result by using a determination coefficient $R^2$, a root-mean-square error (RMSE) and a relative root-mean-square error (RRMSE).

$$RMSE = \sqrt{\sum_{i=1}^{n}(O_i-P_i)^2 \frac{1}{n}}.$$

$$RRMSE = \sqrt{\frac{\sum_{i=1}^{n}(P_i-O_i)^2}{n}} \times \frac{100}{\overline{O_i}}.$$

In the formulas, n is a sample number, Pi is an algorithm prediction value, Oi is a test observation value, and $\overline{O_i}$ is an observation average value.

An algorithm verification determination coefficient $R^2$ is 0.65, the RMSE is 111/m², and the RRMSE is 22.84%.

The Present Invention has the Following Beneficial Effects:

The field wheat stem tillering number extraction method provided by the present invention acquires the field wheat point clouds by means of a LiDAR, applies an adaptive layering-hierarchical clustering analysis algorithm, applies adaptive layering to acquire the number of clusters of wheat, and applies hierarchical clustering analysis to calculate the tillering number of each cluster of wheat, so that the field wheat stem tillering number is extracted, and the rapid and accurate extraction of a large-field crop stem tillering number is realized. The method of the present invention is simple, is convenient to operate, and provides theoretical basis and technical support for the rapid and nondestructive extraction of a field wheat stem tillering number.

By comparing the field wheat stem tillering number extracted by means of the method of the present invention with an actually measured field stem tillering number, according to verification results, a determination coefficient $R^2$ is 0.65, the RMSE is $111/m^2$, and the RRMSE is 22.84%. It shows the feasibility of the method of the present invention.

Additionally, through the field tests at different years, different growth stages, different varieties, different planting densities and different nitrogen application levels, the present invention proves that the stem tillering number extraction algorithm has higher universality and accuracy. At the planting density of a row spacing of 25 cm to 40 cm and a nitrogen fertilizer level of 0 to 300 kg/ha, the method of the present invention can overcome the defects of vigorous plant growth, high point cloud density, strong covering effect between plants and great point cloud noise, and ensures the estimation accuracy of the wheat stem tillering number.

BRIEF DESCRIPTION OF THE DRAWINGS

FIG. 2a is a wheat point cloud of an area, FIG. 2b is a point cloud image of one row of wheat (top view), and FIG. 2c is a schematic three-dimensional diagram of one row of wheat (side view).

DETAILED DESCRIPTION

In order that the technical solutions and advantages of the present invention will become more apparent, the technical solutions of the present invention will be further described in more detail in combination with embodiments.

Figure 1:
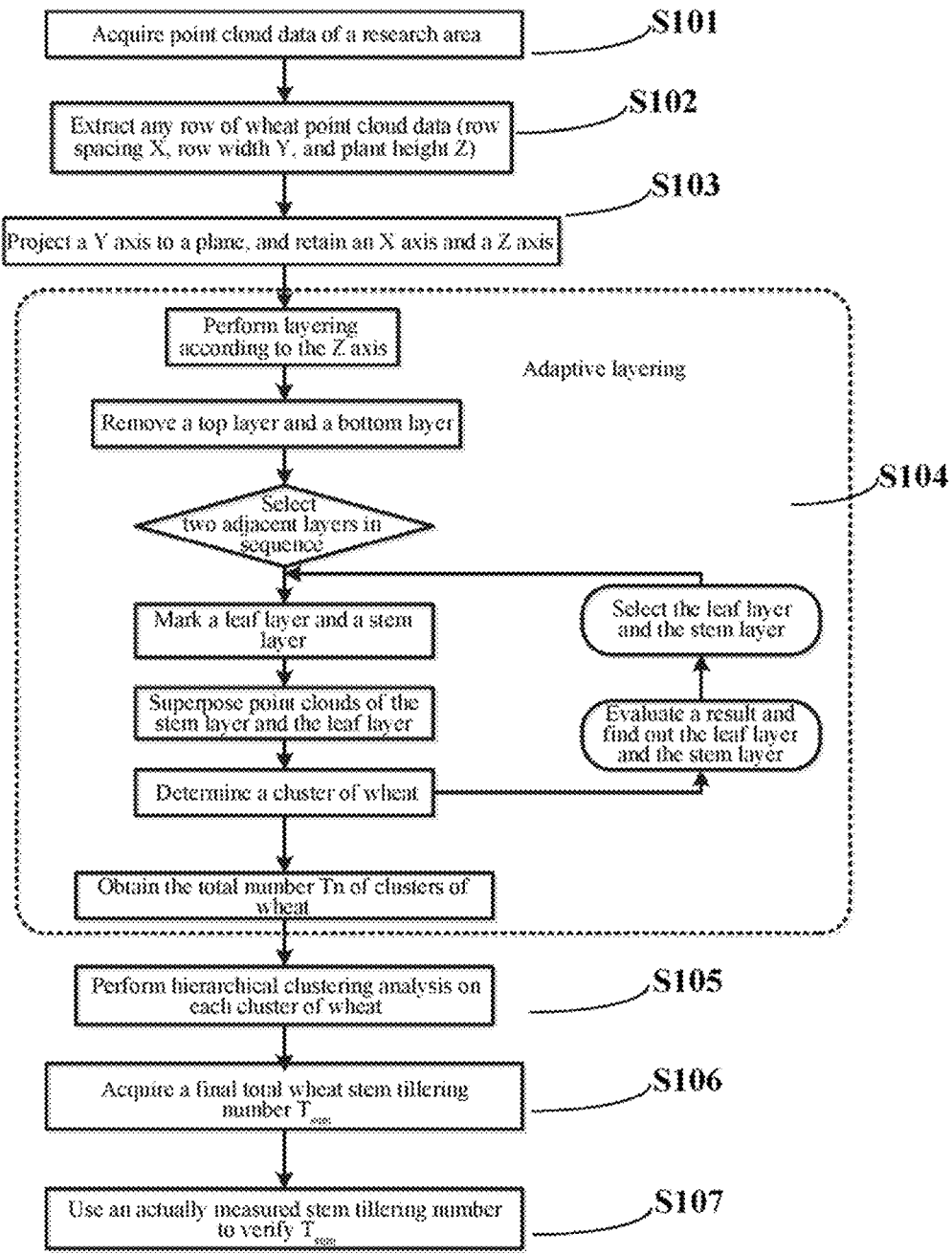
FIG. 1 is a flow chart of a field wheat stem tillering number extraction method of the present invention.

As shown in FIG. 1, a field wheat stem tillering number extraction method of the present embodiment included the following steps:

S101: Point clouds of a research area were acquired.
S102: Any row of wheat point clouds was extracted.
S103: A Y axis value was projected to X-Z plane, and an X axis and a Z axis were retained.
S104: Adaptive layering was applied.
S105: Hierarchical clustering analysis was applied.
S106: A final wheat total stem tillering number $T_{sum}$ was obtained.
S107: Accuracy and universality of the algorithm were verified by using actually measured data.

The following steps were specifically included:

S101: Field wheat point clouds were acquired by using an RIEGL VZ-1000 three-dimensional laser scanner, and actually measured data of the field wheat stem tillering number was synchronously acquired.

2 wheat varieties: Shengxuan No. 6 (V1), and Yangmai 16 (V2). 2 density levels: D1 row spacing being 25 cm ($2.4 \times 10^6$ plants/ha), and D2 row spacing being 40 cm ($1.5 \times 10^6$ plants/ha). 3 nitrogen fertilizer levels: Pure nitrogen 0 kg/ha (N0), 150 kg/ha (N1), and 300 kg/ha (N2). A nitrogen fertilizer, a phosphorus fertilizer and a potassium fertilizer were respectively urea, calcium superphosphate and potassium chloride. 50% of the nitrogen fertilizer was used as a base fertilizer, 50% of the nitrogen fertilizer was used for dressing at a jointing stage, and other fertilizers were used as base fertilizers to be totally applied. Wheat planting mode: Sowing in strip. The test adopted a random area group design, the repeating was performed for 3 times, and the number of areas was totally 36. An area of each area was 30 $m^2$ (6 m×5 m), and the total area was about 1080 $m^2$.

A method of acquiring the wheat point clouds included: adopting an 8-station LiDAR test solution, adopting a scanning mode of 60 mode, i.e., an angular resolution being 0.06°, and acquiring one point data after every rotation for 0.06°.

A method of acquiring the actually measured data of the field wheat stem tillering number included: selecting a wheat test area of 2 rows×1 m in each area, performing manual stem tillering number test, recording the stem tillering number of 1 m double-row wheat in each area, taking an average value as a stem tillering number m of 1 m single-row wheat, so as to obtain the actually measured stem tillering number of the whole row of wheat being 6*m. The practically measured stem tillering number in the whole area was 6*m*the number of rows in the area (if the row spacing was 25 cm, there were 26 rows; and if the row spacing was 40 cm, there were 17 rows), and the wheat stem tillering number of the whole area was acquired.

TABLE 1

Specific conditions of field test

| Ecological point | Growing season | Variety number | Nitrogen fertilizer level (kg/ha) | Planting density (Plant/ha) | Area of area ($m^2$) | Growth stage |
| --- | --- | --- | --- | --- | --- | --- |
| Rugao | 2016-2017 | 2 | 0 | $2.4 \times 10^6$ | 30 | Tillering stage |
|  |  |  | 150 | $1.5 \times 10^6$ |  | Jointing stage |
|  |  |  | 300 |  |  |  |
| Rugao | 2017-2018 | 2 | 0 | $2.4 \times 10^6$ | 30 | Tillering stage |
|  |  |  | 150 |  |  | Jointing stage |
|  |  |  | 300 |  |  |  |

S102: The wheat point clouds obtained in step S102 were subjected to data registration and denoising processing.

Point cloud registration: Each scanning station would have a self-independent coordinate system-a scanner coordinate system. In point cloud processing software RiSCAN PRO, different coordinate systems were registered into the same project coordinate system by means of an ICP algorithm. The ICP algorithm was an optimal matching method based on a least square method, and included: repeatedly determining the nearest point pairs, calculating coordinate conversion parameters of the nearest point pairs and finishing iteration until a given convergence precision was met. For two-point cloud data sets A and B with a certain overlapping portion, A is a reference point cloud data set, and the point cloud B is a coordinate system to be registered, and needs to be converted into the coordinate system of the point cloud A through rotation and translation.

Denoising processing: (1) Drift points were removed: noise points floating in the air were removed by setting an elevation threshold, after high-elevation screening, abnormal point cloud data could be clearly seen, and was deleted. The high-elevation threshold in the present embodiment was set to be 2 m after normalization of point cloud height. (2) Mixed points were removed: Deviation points were removed by setting a Deviation value, the Deviation value was an index for measuring changes between transmitted pulse waveforms and echo pulse waveforms. When the Deviation value was 0, it meant that the waveforms had no distortion, and the received pulse shapes were completely coincident with the transmitted pulse shapes. When the Deviation value was very great, it showed that the waveforms had serious distortion, and these point cloud data needed to be deleted. The Deviation in the present embodiment was set to be 250.

Figure 2:
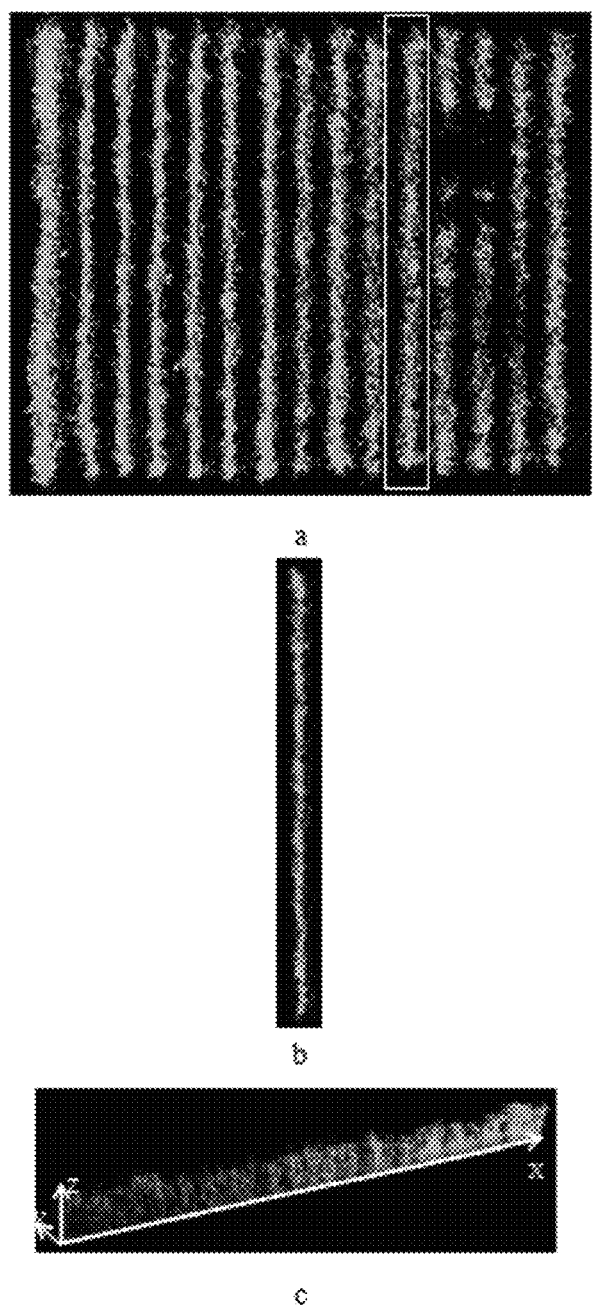
FIG. 2 is a schematic diagram of preprocessing wheat point clouds, where

After point cloud registration and denoising processing, point clouds of a row of wheat (FIG. 2b) were randomly acquired from a wheat point cloud image (FIG. 2a) of an area; the row of wheat point clouds was expressed into a simple cuboid, a row length was defined as X, a row width was defined as Y, and a plant height was defined as Z (FIG. 2c).

Figure 3:
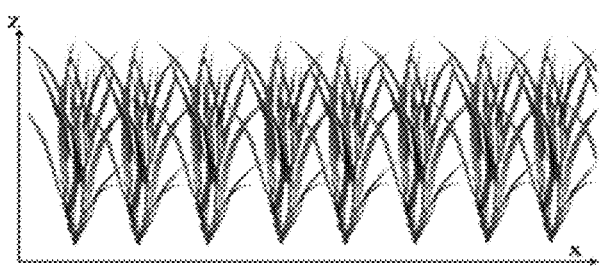
FIG. 3 is a two-dimensional side view of one row of wheat.
Figure 4:
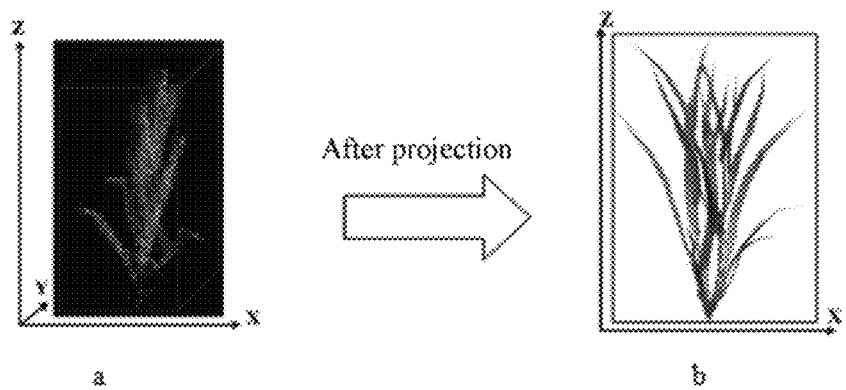
FIG. 4 is a two-dimensional side view of one wheat plant.

S103: In point cloud processing software RiSCAN PRO, an X coordinate axis was used as a main axis and a Z axis was used as an auxiliary axis to realize three-dimensional sorting of point clouds in space, and the three-dimensional point clouds were projected onto an X-Z plane to obtain a wheat two-dimensional side view (FIG. 3). At this moment, one row of wheat was expressed into a big rectangle, any one wheat plant therein was a small 3-dimensional cuboid (FIG. 4a) or a small 2-dimensional rectangle (FIG. 4b).

S104: Adaptive layering was applied.

(1) A tangent sheaf height was set: Based on wheat point clouds at different growth stages, according to an experience method, the tangent sheaf height h was set to be 4 cm.

(2) An average plant height of one row of wheat was calculated: One row of wheat was divided into segments at intervals in a direction of the X axis according to a step length of 0.1 m, the plant height of each segment of wheat after segment division was calculated, and finally, an average value of the plant height of each segment was taken to obtain an average plant height H of the row of wheat.

Figure 5:
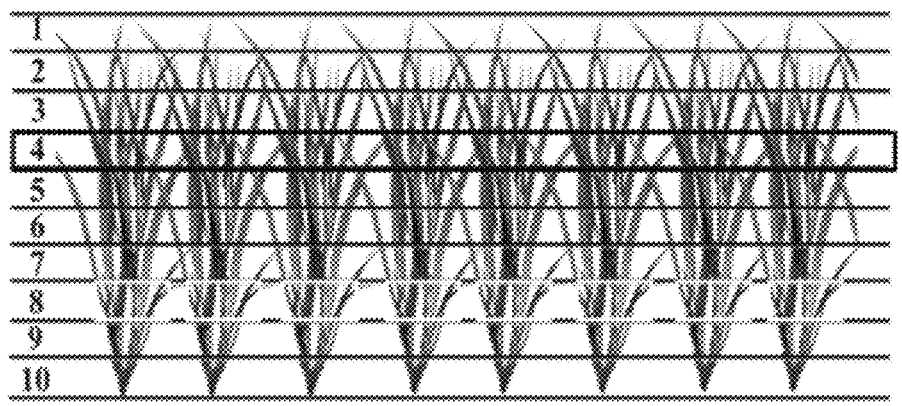
FIG. 5 is a schematic diagram for adaptive layering.
Figure 5:
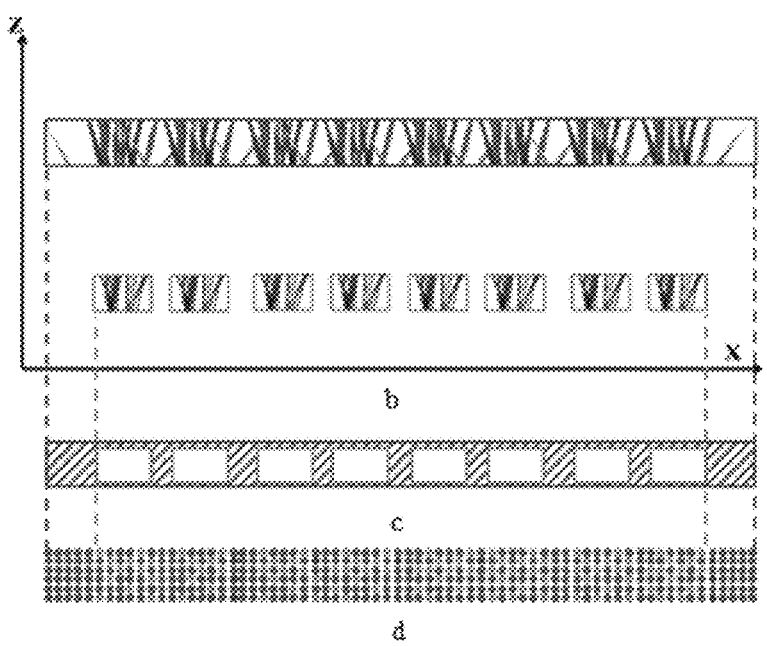

(3) Layering was performed according to the Z axis: A number of layers n=average plant height H/tangent sheaf height h, and the number of layers was numbered in a sequence of Arabic numerals from top to bottom in the direction of the Z axis. For example, at a jointing stage, the wheat plant height H was about 40 cm, and the layering number 40/4=10 layers (FIG. 5a).

(4) The leaf layer and the stem layer were marked: A lowest layer ($10^{th}$ layer, soil layer) and a highest layer ($1^{st}$ layer, top layer) were removed, and the point clouds of a top layer ($2^{nd}$ layer) and a bottom layer ($9^{th}$ layer) of the 8 remaining layers (10−2=8) were respectively marked by attribute fields: the leaf layer ($2^{nd}$ layer) was marked as "1", and the stem layer ($9^{th}$ layer) was marked as "0".

(5) The stem layer marked in step (4) was laminated onto the leaf layer to integrate the stem layer and the leaf layer into one layer, and the X axis was sorted according to X coordinate values. It was determined that the front was a cluster of wheat when a mixture of the leaf layer and the stem layer was met, continuous point clouds of the leaf layer were met later, but no point cloud of the stem layer was met, and the number of clusters of the row of wheat was determined one by one by parity of reasoning (FIG. 5b, the black showed the leaf layer of one row of wheat, and the gray showed the stem layer of one row of wheat; FIG. 5c, the leaf layer and the stem layer were laminated into one layer, the black was the leaf layer, the gray was the stem layer; and FIG. 5d, it was determined that the leaf layer and the stem layer in front of this part were a cluster of wheat when a mixture of the leaf layer and the stem layer was met and only continuous black (leaf layer) point clouds were met later).

(6) For the number of remaining layers, the step (4) and step (5) were sequentially repeated for analysis by taking adjacent 2 layers as a combination from top to bottom, so as to obtain the number of clusters of wheat. As shown in FIG. 5a, the sequentially analyzed combinations were 2-3 layers, 3-4 layers, 4-5 layers, 5-6 layers, 6-7 layers, 7-8 layers, and 8-9 layers.

(7) The results were comprehensively evaluated: If the number of clusters of wheat obtained from a combination was much greater than the number of clusters of wheat obtained from a previous combination (the calculation result of a pure leaf layer may be 0 or a single number, and the result of a mixed stem and leaf layer may be more than a hundred), it indicated that the layer with a greater number in the combination was the stem layer, the layer with a smaller number was the leaf layer, and the combination was a stem and leaf connection combination. The number of all layers higher than the leaf layer of the stem and leaf connection combination in the direction of the Z axis was marked as the leaf layer, the number of all layers lower than the stem and leaf connection combination was marked as the stem layer, and the leaf layer and the stem layer were marked one by one by attribute fields.

(8) One layer was selected from the leaf layers, one layer was selected from the stem layers, and the step (4) and step (5) were repeated again to obtain the total number of clusters of the row of wheat $T_n$ (n=1, 2, 3, . . . , n).

S105: In point clouds of each cluster of wheat, each point was taken as a variable (including coordinate information xpoint, ypoint and zpoint: X, Y, Z), a Euclidean distance was selected as a similarity measurement, and a specific formula was as follows:

$$d_{ij} = \sqrt{(x_i - x_j)^2 + (y_i - y_j)^2 + (z_i - z_j)^2} \quad (1)$$

In the formula, i and j represented 2 arbitrary points, dij was a Euclidean distance between variables i and j, coordinate information of the variable i was ($x_i$, $y_i$, $z_i$), and coordinate information of the variable j was ($x_j$, $y_j$, $z_j$).

The similarity measurement between the variables was respectively calculated, clusters 1 and 2 with a shortest Euclidean distance in a similarity matrix were found, the clusters 1 and 2 were merged to be used as a new class, a space from the new class to other clusters in the current cluster was calculated, an iteration condition was set to be that the Euclidean distance d=2 cm (a smallest distance between two tillering portions in one cluster of wheat), and iteration was stopped when the condition that d>2 was met. At this moment, the number of clusters was the tillering number of each cluster of wheat. If the condition was not met, the iteration was continuously performed.

S106: The stem tillering number $T_n + T_{nk}$ (k=1, 2, 3, . . . , k, and k represented the tillering number in each cluster of wheat) of each cluster of wheat was calculated; and by parity of reasoning, the stem tillering number of one whole row of wheat was obtained according to $T_{sum} = T_1 + T_2 + T_3 + \ldots + T_n + T_{1k} + T_{2k} + T_{3k} + \ldots + T_{nk}$.

S107: Accuracy and universality of the method of the present embodiment were verified by using wheat stem tillering number data (Year 2017-Year 2018) obtained through field tests, and comprehensive evaluation was performed by using a determination coefficient ($R^2$), a root-mean-square error (RMSE) and a relative root-mean-square error (RRMSE).

Calculation formulas for evaluating indexes RMSE and RRMSE were as follows:

$$MSE = \sqrt{\sum_{i=1}^{n}(O_i - P_i)^2 \frac{1}{n}} \text{; and}$$

$$RRMSE = \sqrt{\frac{\sum_{i=1}^{n}(P_i - O_i)^2}{n}} \times \frac{100}{\overline{O_i}}.$$

In the formulas, n was a sample number, $P_i$ was a model prediction value, $O_i$ was a test observation value, and $\overline{O_i}$ was an observation average value.

Figure 6:
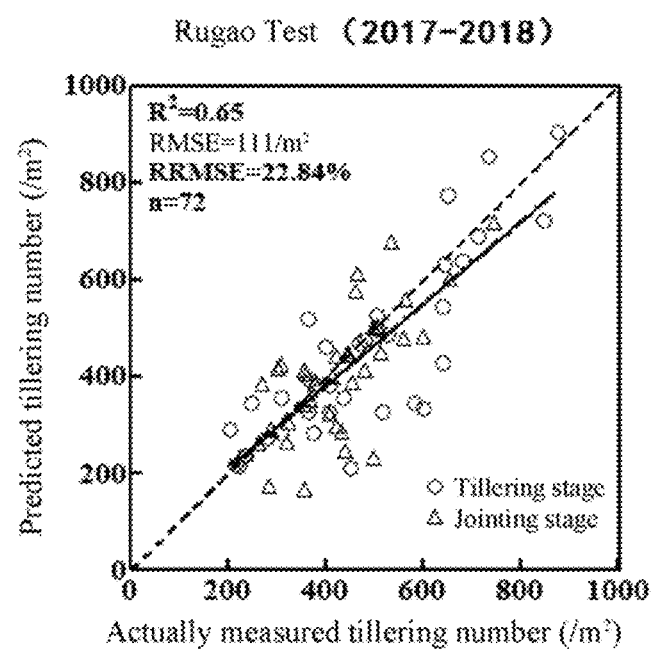
FIG. 6 is a result verification diagram.

As shown in FIG. 6, according to verification results, the determination coefficient $R^2$ was 0.65, the RMSE was 111/m², and the RRMSE was 22.84%.

The foregoing descriptions are merely preferred examples of the present invention, but are not intended to limit the present invention. Any modification, equivalent substitution, improvement and the like made within the spirit and principle of the present invention shall fall within the protection scope of the present invention.

What is claimed is:

1. A field wheat stem tillering number extraction method, comprising the following steps:
   step (1): acquiring a wheat stem tillering number sample and point clouds;
   step (2): randomly acquiring a row of wheat point clouds from a wheat point cloud obtained in step (1), preprocessing the row of wheat point clouds, projecting a Y axis to a plane, and retaining an X axis and a Z axis to obtain a wheat two-dimensional side view;
   step (3): applying adaptive layering to obtain a number of clusters of a row of wheat; and
   step (4): applying hierarchical clustering analysis to obtain a tillering number of each cluster of wheat, and further obtaining a stem tillering number of the whole row of wheat.

2. The field wheat stem tillering number extraction method according to claim 1, wherein in step (1), the wheat point clouds are acquired by using an RIEGL VZ-1000 three-dimensional laser scanner, and the wheat stem tillering number sample is synchronously acquired.

3. The field wheat stem tillering number extraction method according to claim 1,
   wherein in step (2), the preprocessing the wheat point clouds comprises: after point cloud registration and denoising processing, randomly acquiring a row of wheat at first from a wheat point cloud of an area; expressing the row of wheat into a cuboid, defining a row length as X, a row width as Y and a plant height as Z; and performing three-dimensional sorting of point clouds in space by using an X coordinate axis as a main axis and a Z axis as an auxiliary axis, and projecting the three-dimensional sorted point clouds onto an X-Z plane to obtain the wheat two-dimensional side view.

4. The field wheat stem tillering number extraction method according to claim 1,
   wherein in step (3), the adaptive layering comprises:
   distinguishing wheat point clouds of a leaf layer from wheat point clouds of a stem layer in a Z direction;
   laminating the stem layer onto the leaf layer to integrate the stem layer and the leaf layer into one layer; sorting the X axis according to X coordinate values; determining that a front is a cluster of wheat when a mixture of the leaf layer and the stem layer is met, continuous point clouds of the leaf layer are met later, but no point cloud of the stem layer is met; and
   determining the number of clusters of the row of wheat one by one by parity of reasoning.

5. The field wheat stem tillering number extraction method according to claim 4, wherein the adaptive layering comprises:
   a) dividing a row of wheat into segments at intervals in a direction of the X axis, calculating a plant height of each segment of wheat after segment division, and obtaining an average plant height H of the row of wheat;
   b) performing layering according to the Z axis, wherein a number of layers n=average plant height H/tangent sheaf height h, and numbering the layers in a sequence of Arabic numerals from top to bottom in the direction of the Z axis;
   c) marking the leaf layer and the stem layer: removing a lowest layer and a highest layer, and respectively marking point clouds of a top layer and a bottom layer of the remaining layers as the leaf layer and the stem layer;
   d) laminating and integrating the stem layer and the leaf layer determined in step c) into one layer; sorting the X axis according to X coordinate values; determining that the front is a cluster of wheat when a mixture of the leaf layer and the stem layer is met, continuous point clouds of the leaf layer are met later, but no point cloud of the stem layer is met; and determining the number of clusters of the row of wheat one by one by parity of reasoning;
   e) for remaining layers, sequentially repeating step c) and step d) for analysis in the direction of the Z axis by taking adjacent 2 layers as a combination from top to bottom, so as to obtain the number of clusters of the row of wheat, wherein if the number of clusters of the row of wheat obtained from a certain combination is greater than that of a previous combination, it shows that the layer with a greater number in the combination is the stem layer, the layer with a smaller number is the leaf layer, the combination is a stem and leaf connection combination; and marking layers of all leaf layers higher than the stem and leaf connection combination in the direction of the Z axis as the leaf layers, and marking layers of all stem layers lower than the stem and leaf connection combination as the stem layers; and
   f) selecting one layer from the marked leaf layers, selecting one layer from the marked stem layers, and repeating step c) and step d) again to obtain the number of clusters of the row of wheat $T_n$, wherein n=1, 2, 3, ..., n.

6. The field wheat stem tillering number extraction method according to claim 5, wherein the wheat is divided into segments at intervals according to a step length of 0.1 m in the direction of the X axis, and a tangent sheaf height h is 4 cm.

7. The field wheat stem tillering number extraction method according to claim 5,
   wherein in step (4), the hierarchical clustering analysis comprises: in point clouds of each cluster of wheat, by taking each point as a variable and selecting a Euclidean distance as a similarity measurement, respectively calculating the similarity measurement between the variables, classifying points with a high similarity into one class, i.e., one tillering so as to calculate a number of classes to obtain a wheat tillering number, and calculating the tillering number $T_{nk}$ of each cluster of wheat, wherein k=1, 2, 3, . . . , k, and k represents the tillering number in each cluster of wheat; obtaining a stem tillering number of one row of wheat according to $T_{sum}=T_1+T_2+T_3+\ldots+T_n+T_{1k}+T_{2k}+T_{3k}+\ldots+T_{nk}$; and finally, converting the stem tillering number of one row of wheat into a stem tillering number of the whole area.

8. The field wheat stem tillering number extraction method according to claim 7, wherein a similarity measurement formula is:

$$d_{ij}=\sqrt{(x_i-x_j)^2+(y_i-y_j)^2+(z_i-z_j)^2}.$$

wherein i and j represent 2 arbitrary points, dij is a Euclidean distance between variables i and j, coordinate information of the variable i is $(x_i, y_i, z_i)$, and coordinate information of the variable j is $(x_j, y_j, z_j)$.

9. The field wheat stem tillering number extraction method according to claim 7, wherein the hierarchical clustering analysis comprises: in point clouds of each cluster of wheat, by taking each point as a variable and selecting a Euclidean distance as a similarity measurement, respectively calculating the similarity measurement between the variables, finding clusters 1 and 2 with a shortest Euclidean distance, merging the clusters 1 and 2 to be used as a new class, calculating a space from the new class to other clusters in the current cluster, setting an iteration condition to be that the Euclidean distance d=2 cm, and stopping iteration when the condition that d>2 cm is met, so as to obtain the tillering number of each cluster of wheat.

10. The field wheat stem tillering number extraction method according to claim 1, further comprising: verifying feasibility of an algorithm: verifying feasibility and accuracy of a test algorithm by using independent year stem tillering number sample data, and performing comprehensive evaluation on a result by using a determination coefficient $R^2$, a root-mean-square error (RMSE) and a relative root-mean-square error (RRMSE).

\* \* \* \* \*